United States Patent
Suemoto et al.

(10) Patent No.: US 7,236,193 B2
(45) Date of Patent: Jun. 26, 2007

(54) APPARATUS AND METHOD TO CAPTURE IMAGE AND OTHER DATA AND RECORDING ONTO MULTIPLE RECORDING MEDIUM

(75) Inventors: Kazunori Suemoto, Saitama (JP); Seiichi Matsui, Saitama (JP)

(73) Assignee: Fujifilm Corporation, Tokyo (JP)

( * ) Notice: Subject to any disclaimer, the term of this patent is extended or adjusted under 35 U.S.C. 154(b) by 795 days.

(21) Appl. No.: 09/757,471

(22) Filed: Jan. 11, 2001

(65) Prior Publication Data
US 2002/0018130 A1 Feb. 14, 2002

(30) Foreign Application Priority Data
Jan. 11, 2000 (JP) ............................. 2000-003029

(51) Int. Cl.
H04N 5/76 (2006.01)

(52) U.S. Cl. ................................. 348/231.8

(58) Field of Classification Search ............ 348/231.8, 348/231.7, 231.4, 231.3, 231.2, 231.99, 207.99, 348/231.1; 386/117
See application file for complete search history.

(56) References Cited

U.S. PATENT DOCUMENTS

| | | | | |
|---|---|---|---|---|
| 5,627,587 A | * | 5/1997 | Murata et al. ........... | 348/231.7 |
| 5,986,700 A | * | 11/1999 | Wakui ..................... | 348/231.8 |
| RE36,589 E | * | 2/2000 | Akamine et al. ............ | 369/14 |
| 6,020,982 A | * | 2/2000 | Yamauchi et al. .......... | 358/444 |
| 6,449,426 B1 | * | 9/2002 | Suga et al. ................. | 386/117 |
| 6,992,711 B2 | * | 1/2006 | Kubo ..................... | 348/231.7 |

FOREIGN PATENT DOCUMENTS

JP   A591455   4/1993

\* cited by examiner

Primary Examiner—Tuan Ho
(74) Attorney, Agent, or Firm—Birch, Stewart, Kolasch & Birch, LLP (57) ABSTRACT

An image capturing apparatus that is capable of loading a plurality of memory media that includes a plurality of medium wearable units where a respective memory medium is loaded detachably; a medium selector for selecting from said plurality of medium wearable units a write-execution medium wearable unit that should execute writing of data; and a selection controller for controlling said medium selector, said selection controller having an automatic selection controller for selecting said write-execution medium wearable unit according to a predetermined automatic selection basis that reflects a user's medium selection trait.

47 Claims, 5 Drawing Sheets

| | AUTOMATIC SELECTION BASIS | | |
|---|---|---|---|
| | LOADED ORDER | RESOLUTION | DATA TYPE (IMAGE/AUDIO) |
| A | FIRST | HIGH | IMAGE |
| B | | LOW | AUDIO |

APPARATUS AND METHOD TO CAPTURE IMAGE AND OTHER DATA AND RECORDING ONTO MULTIPLE RECORDING MEDIUM

This patent application claims priority from a Japanese patent application No. 2000-003029 filed on Jan. 11, 2000, the contents of which are incorporated herein by reference.

BACKGROUND OF THE INVENTION

1. Field of the Invention

The present invention relates to a digital camera. In particular, the present invention relates to a digital camera that is capable of loading a plurality of memory media.

2. Description of the Related Art

Digital cameras are popular as a form of convenient electronics. One of the features of digital cameras is that digital cameras are capable of recording photographed images in a memory device. The memory device can be detached from the body of a camera, be set to a personal computer, or be brought to a photo shop. A typical memory device and its medium wearable unit are a memory card and a card slot.

It has been proposed that a digital camera be equipped with a plurality of card slots so that a plurality of memory cards described above can be loaded simultaneously. If a digital camera is equipped with a plurality of card slots, photographed images can be recorded in the plurality of memory cards, thereby the number of photographable images will be increased. However, a user has to designate in which memory card of a card slot to record data. If the designated card slot does not have a memory card loaded, the user has to conduct the necessary operations, such as to reselect a card slot, because the data will not be recorded as it is. Thus, simply increasing the number of card slots makes the operation complex.

In the Japanese Patent Application Laid-Open No.H5-91455, a digital camera is equipped with two memory cards. A memory card for recording is switched to another according to the available memory of these memory cards. This automatic switching partly reduces the complexity of the user operations. However, it is generally after there in not enough available memory that a user considers the available memory when manually selecting a card slot. In the ordinary state when the available memory is enough, users usually consider whether the recorded data is easy to manage rather than to consider whether there is enough available memory. If the card slot is switched to another according to the available memory for its problems above, data may be recorded in the unintended memory card, thereby the later data management may become inconvenient. This inconvenience may impair the use of the digital camera after all. The above problem is not limited only to memory cards and card slots. Similar problems may arise regarding a given memory medium and its medium wearable unit.

SUMMARY OF THE INVENTION

Therefore, it is an object of the present invention to provide for digital cameras that are capable of automatically selecting an appropriate medium wearable unit for a medium from a plurality of medium wearable units, which is capable of overcoming the above drawbacks accompanying the conventional art. The above and other objects may be achieved by combinations described in the independent claims. The dependent claims define further advantageous and exemplary combinations of the present invention.

According to the first aspect of the present invention, an image capturing apparatus that is capable of loading a plurality of memory media includes: a plurality of medium wearable units in which a respective memory medium is loaded detachably; a medium selector for selecting from the plurality of medium wearable units a write-execution medium wearable unit that executes writing of data; and a selection controller for controlling the medium selector, the selection controller having an automatic selection controller for selecting the write-execution medium wearable unit according to a predetermined automatic selection basis that reflects a user's medium selection trait.

The selection controller may select another medium wearable unit when the available memory of the write-execution medium wearable unit selected according to the predetermined automatic selection basis is not enough.

The selection controller may automatically select another medium wearable unit when the available memory of the selected write-execution medium wearable unit in use is not enough.

The predetermined automatic selection basis may be set based on the order of media loaded to the plurality of medium wearable units. The predetermined automatic selection basis may be set based on the resolution of image data to be written. The predetermined automatic selection basis may be set based on the type of data to be written.

The data to be written may be classified into image data and non-image data. The non-image data may be audio data.

The plurality of medium wearable units may adapt to different types of memory media, and the types of data to be written may correspond to the type of memory media in the predetermined automatic selection basis.

The image capturing apparatus may further include a selection basis setting section for setting at least one selection basis selected from a plurality of the predetermined automatic selection bases.

The image capturing apparatus may further include a mode switch for switching between a manual selection mode, which a user manually selects the write-execution medium wearable unit, and an automatic selection mode, which the automatic selection controller selects the write-execution medium wearable unit.

The selection controller may select another medium wearable unit when the memory medium is not loaded in the write-execution medium wearable unit selected by the user under the manual selection mode.

The selection controller may notify the user that the memory medium is not loaded when the memory medium is not loaded in the write-execution medium wearable unit selected by the user under the manual selection mode, and may notify the user that the memory medium be loaded in the medium wearable unit where the memory medium is not loaded. The notice is made by audio.

The image capturing apparatus may further include at least one notice means providing a notice in different ways according to a status of the medium wearable unit.

The image capturing apparatus may further include a power controller for controlling the power supply to the medium wearable unit that is not selected as the write-execution medium wearable unit.

According to the second aspect of the present invention, a method for recording data of an image capturing apparatus includes: preparing a plurality of medium wearable unit; and selecting from the plurality of medium wearable units a write-execution medium wearable unit that executes writing of data. 18. The data recording method as claimed in claim 17, further includes controlling the medium selecting, the controlling the medium selecting selecting the write-execution medium wearable unit according to a predetermined automatic selection basis that reflects a user's medium selection trait.

The controlling the selecting may select another medium wearable unit when there is not enough available memory in the write-execution medium wearable unit selected according to the predetermined automatic selection basis.

The controlling the selecting may automatically select another medium wearable unit when the available memory of the selected write-execution medium wearable unit in use is not enough.

The automatic selection basis may be set based on the order of media loaded to the plurality of medium wearable units. The automatic selection basis may be set based on the resolution of image data to be written. The automatic selection basis may be set based on the type of data to be written.

The data to be written may be classified into image data and non-image data. The non-image data may be audio data.

The plurality of medium wearable units may adapt to different types of memory media, and the types of data to be written correspond to the type of memory media in the predetermined automatic selection basis.

The data recording method may further include setting at least one selection basis selected from the predetermined plurality of automatic selection bases.

The data recording method may further include switching a manual selection mode, which a user manually selects the write-execution medium wearable unit, and an automatic selection mode, which the automatic selection controller selects the write-execution medium wearable unit.

The controlling the selecting may select other medium wearable unit when the memory medium is not loaded in the write-execution medium wearable unit selected by the user using the manual selection mode.

The controlling the selecting may notify the user that the memory medium is not loaded when the memory medium is not loaded in the write-execution medium wearable unit selected by the user using the manual selection mode, and notifies the user that the memory medium be loaded in the medium wearable unit where the memory medium is not loaded. The notice is made by audio.

The method for recording data of an image capturing apparatus may further include notifying for providing a notice in different ways according to a status of the medium wearable unit.

The method for recording data of an image capturing apparatus may further include controlling the power supply to the medium wearable unit that is not selected as the write-execution medium wearable unit.

According to the third aspect of the present invention, a recording medium for storing a program that is executable by a computer of an image capturing apparatus, the program includes selecting from a plurality of medium wearable units a medium wearable unit that executes writing of data according to a predetermined automatic selection basis that reflects a user's medium selection trait.

The summary of the invention does not necessarily describe all necessary features of the present invention. The present invention may also be a sub-combination of the features described above. The above and other features arid advantages of the present invention will become more apparent from the following description of the embodiments taken in conjunction with the accompanying drawings.

DETAILED DESCRIPTION OF THE INVENTION

The invention will now be described based on the preferred embodiments, which are not intended to limit the scope of the present invention, but exemplify the invention. All of the features and the combinations thereof described in the embodiment are not necessarily essential to the invention.

Figure 1:
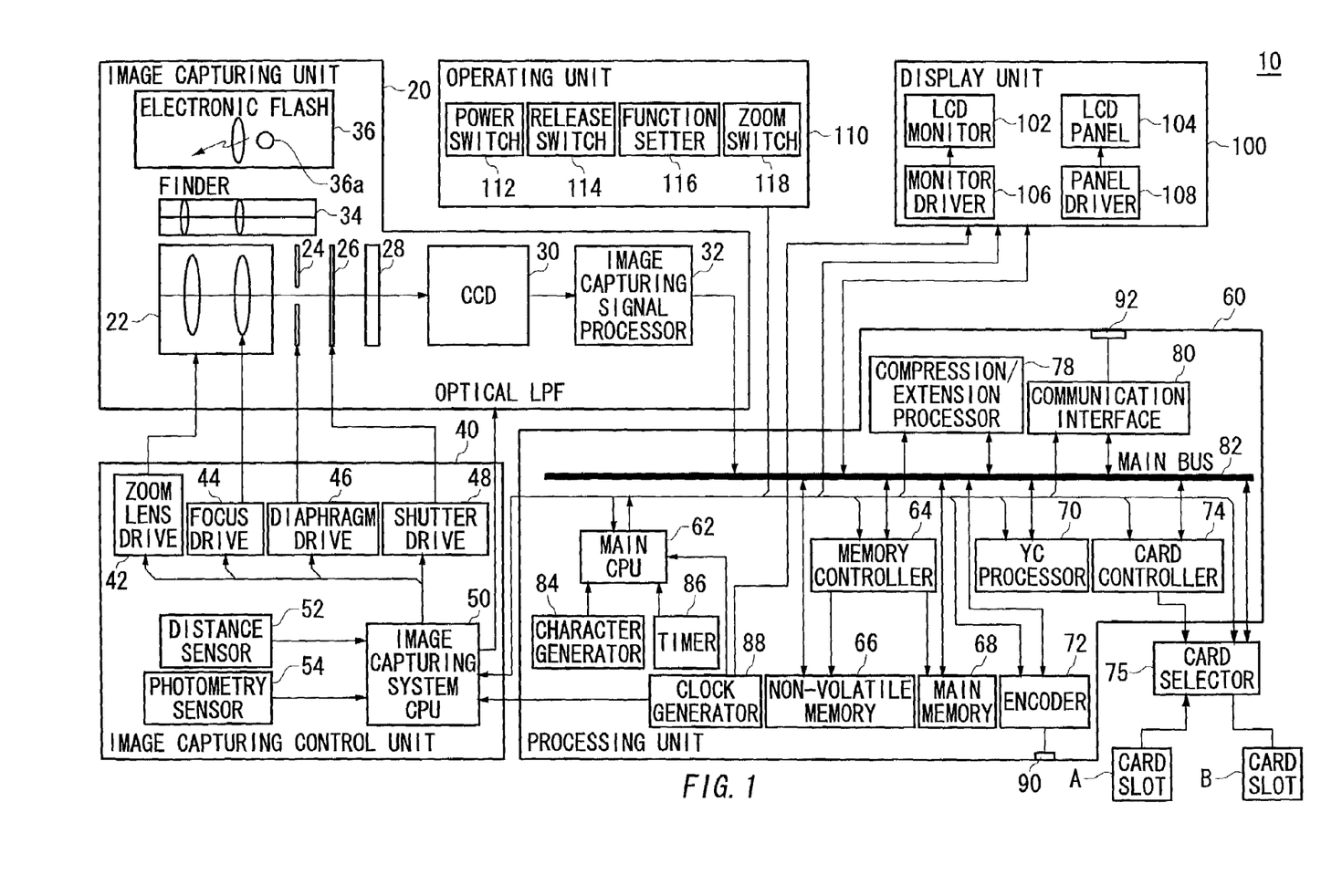
FIG. 1 is a block diagram showing the entire structure of a digital camera according to an embodiment of the present invention.

FIG. 1 is a block diagram depicting a structure of a digital camera 10 according to an embodiment of the present invention. The structures characterized by the present embodiment will be described in FIG. 2. The digital camera according to the present embodiment includes a card slot for a memory card as an example of a medium wearable unit.

As shown in FIG. 1, a digital camera 10 is mainly comprised of an image capturing unit 20, an image capturing control unit 40, a processing unit 60, a display unit 100, and an operating unit 110.

The image capturing unit 20 includes structural and electrical members pertaining to photographing and image forming. That is, the image capturing unit 20 is provided with a lens section 22, which captures an image and processes the captured image, a diaphragm 24, a shutter 26, an optical LPF or low pass filter 28, a CCD 30, and a capture-signal processor 32. The lens section 22 preferably includes a focus lens and a zoom lens. The structure makes it possible to form an image of an object on the surface of the light reception of the CCD 30. Each sensor element of the CCD 30, though it is not shown in FIG. 1, stores an electric charge (referred to as "stored electric charge"). The stored electric charge is transferred up with a read gate pulse to a shift register not shown in FIG. 1, and subsequently transferred out sequentially with a register transfer pulse as a voltage signal.

Since the digital camera 10 generally has an electric shutter function, a mechanical shutter such as the shutter 26 is not always necessary. A shutter drain is setup in the CCD 30 through a shutter gate in order to achieve the electric shutter function. When the shutter gate is activated, the stored electric charge is drained out to the shutter drain. The shutter gate may control the shutter speed, which is the time to store the electric charge in each sensor element.

The voltage signal output from the CCD 30, that is, an analog signal, is color-separated by the capture-signal processor 32 into R, G, and B elements, and the white balance is adjusted. The capture-signal processor 32 then takes place a gamma correction, sequentially converts the R, G, and B signals from analog into digital form by the necessary timing, and outputs the obtained digital image data (referred to as "digital image data") to the processing unit 60.

The image capturing unit 20 further includes a finder 34 and an electronic flash 36. The finder 34 may be equipped with an LCD not shown in FIG. 1. In that case, the finder 34 displays various pieces of information provided by a main CPU 62 described later. The electronic flash 36 performs to emit light when the energy stored in a capacitor, not shown in FIG. 1, is supplied to a discharge tube 36a.

The image capturing control unit 40 is comprised of a zoom lens driver 42, a focus driver 44, a diaphragm driver 46, a shutter driver 48, an image capturing system CPU 50 for controlling all of the above-mentioned drivers, a distance sensor 52, and a photometry sensor 54. Each of the drivers such as the zoom lens driver 42 has a driving means such as a stepping motor or the like. In a response to a snap of a release switch 114 described later, the distance sensor 52 gauges the distance defined between the camera and the object, and the photometry sensor 54 measures the brightness of the object. The gauged distance data (referred to as "gauged distance data") and the measured brightness data of the object (referred to as "measured luminance data") are transmitted to the image capturing system CPU 50. The image capturing system CPU 50 controls the zoom lens driver 42 and the focus driver 44 based on the photograph information provided by a user such as the magnification of the zoom lens, and makes adjustments of the magnification of the zoom lens and focus for the lens section 22.

The image capturing system CPU 50 determines an aperture value and a shutter speed, based on the integrated value of digital signals of RGB in one image frame, which is called as AE information. According to the aperture value and the shutter speed thus determined, the diaphragm driver 46 and the shutter driver 48 respectively adjust the amount of aperture and then drive the shutter 26 to open and close.

The image capturing system CPU 50 also controls the light intensity emitted from the electronic flash 36 based on the measured brightness data, and simultaneously adjusts the amount of aperture of the diaphragm 24. When the user instructs the camera to pick up an image, the CCD 30 starts to store up the electric charge. Then, the stored electric charge is output to the capture-signal processor 32 after the expiration of the shutter time calculated on the basis of the measured brightness data.

The processing unit 60 is comprised of a main CPU 62, which controls the whole digital camera 10, including the processing unit 60 itself, a memory controller 64 which is also controlled by the main CPU 62, a YC processor 70, an optional device controller 74, a compression/extension processor 78, and a communication interface (I/F) section 80. The main CPU 62 communicates necessary information with the image capturing system CPU 50 by serial communication, for example. A clock generator 88 provides an operating clock for the main CPU 62. The clock generator 88 also provides clocks of different frequencies respectively to the image capturing system CPU 50 and the display unit 100.

The main CPU 62 is also comprised of a character generator 84 and a timer 86. The timer 86 is backed up by batteries and counts the time and date continuously. This count value gives the main CPU 62 information about the time and date of photograph and other time related information. The character generator 84 generates character information such as the time and date of photograph or a title. This character information will then appropriately be superimposed with a photographic image.

The memory controller 64 controls a non-volatile memory 66 and a main memory 68. The non-volatile memory 66 is comprised of components such as an EEPROM or electrically-erasable programmable ROM, and a flash memory. The non-volatile memory 66 stores data such as setting information set by the a user or an adjustment value before shipment, which should be kept even when the power of the digital camera 10 is turned off. The non-volatile memory 66 may store a boot program or a system program of the main CPU 62 if necessary. On the other hand, the main memory 68 may generally be a relatively inexpensive memory having a large capacity such as a DRAM. The main memory 68 may include: a frame memory function, which stores data output from the image capturing unit 20; a system memory function, which is loaded with various programs; and a work area function. The non-volatile memory 66 and the main memory 68 may transmit data back and forth among the components inside and outside of the processing unit 60 via a main bus 82.

The YC processor 70 performs a Y-to-C conversion on digital image data and generates a luminance signal Y and a chrominance signal B-Y and R-Y. The memory controller 64 temporarily stores the luminance signal and the chrominance signal in the main memory 68. The compression/extension processor 78 sequentially reads the luminance signal and the chrominance signal from the main memory 68. The compression/extension processor 78 then compresses the luminance signal and the chrominance signal. A memory card, which is one kind of the optional device writes through the optional device controller 74 the compressed data described above (referred to as "compressed data"). Whether to write in the card slot A or the card slot B is selected by a card selector 75. The main CPU 62 controls the card selector 75.

The processing unit 60 further includes an encoder 72. The encoder 72 inputs a luminance signal and a chrominance signal. Then, the encoder 72 converts the luminance signal and the chrominance signal into video signals such as National Television System Committee (NTSC) and Phase Alternation by Line (PAL) signals. The encoder 72 outputs the converted video signals through a video output terminal 90. In order to generate the video signal from the data recorded in the memory card, first the data is transmitted to the compression/extension processor 78 through the card controller 74. Then, the data, which has been subjected to a necessary process by the compression/extension processor 78, is converted into a video signal by the encoder 72.

The card controller 74 generates necessary signals, a logic conversion, and a voltage conversion, between the main bus 82 and a memory card (slot) according to the signal specifications and the bus specifications of the main bus 82 recognized by the memory card. The digital camera 10 may support, for example, an I/O card, which is a standard PCMCIA-compliant card, other than the above-described memory card, as an optional device. In this case, the optional device controller 74 may include a bus control LSI for PCMCIA.

The communication I/F section 80 controls such as a protocol conversion based on a communication specification for which the digital camera 10 supports, that is, a specification such as USB, RS-232C, or Ethernet, for example. The communication I/F section 80 may be provided with a driver IC if necessary, and may communicate with external devices including networks through a connector 92. Other than those standard specifications, the communication I/F section 80 can have a structure that exchanges data, through a particular interface, with an external device such as a printer, a karaoke device, or a game device.

The display unit 100 is comprised of an LCD monitor 102 and an LCD panel 104. A monitor driver 106 and a panel driver 108 respectively control the LCD monitor 102 and the LCD panel. The LCD monitor 102 may be, for example, a 2-inch monitor, and is set in the back of a camera. The LCD monitor 102 displays the modes of the present photographs and plays, magnification of the zoom lens for photographing and playing, the amount of energy left in batteries, time and date, a display for setting a mode, and subject images. The LCD panel 104 maybe, for example, a small monochrome LCD, and is set on the top of a camera. The LCD panel 104 simply displays information such as the image quality described as FINE/NORMAL/BASIC, on/off of the electronic flash, the standard number of possible photographs, the number of pixels, and the amount of power left in the batteries.

The operating unit 110 is comprised of apparatuses and electric members, which are necessary for the user to set or instruct the operation or the mode of the operation of the digital camera 10. The power switch 112 determines whether the power of the digital camera 10 is turned on or off. The release switch 114 has a dual structure having the half push switch and the full push switch. For example, the half push switch locks AF and AE, and the full push switch captures a photographic image. After necessary processes such as the signal processing and the compression of data are completed, the captured image will be stored in the main memory 68 or the optional device 76. The operating unit 110 may have a setting such as a rotary dial for mode or cross key other than the power switch 112 and the release switch 114. The dial for mode and the cross key are collectively referred to as a function setter 116 as in FIG. 1. Function settings include "file format", "special effects", "photographic printing", "confirm/save", and "display switching", for example, as an operation or a function, which can be designated by using the operating unit 110. The zoom switch 118 is operated to set the magnification of zooming.

The main operations according to the structures described above are as follows. First, the power switch 112 may be operated to turn the digital camera 10. Electric power is supplied to each part of the camera 10. The main CPU 62 judges the mode of the digital camera 10, by reading the state of the function setter 116. The mode is selected from between a photograph mode and a play mode.

If the digital camera 10 is in the still picture photograph mode, the main CPU 62 monitors for the half-position state of the release switch 114. When the main CPU 62 detects the half-position state, the main CPU 62 obtains photometry data and distance data from the photometry sensor 54 and the distance sensor 52, respectively. The control unit 40 operates based on the obtained data, and adjustments, such as focus and an aperture of the photographic lens 22, are made. When the adjustments are completed, the main CPU 62 displays letters such as "standby" on the LCD monitor 102 to notify the state to the user.

Then, the main CPU 62 monitors for the full-position state of the release switch 114. When the release switch 114 is pressed to the full-position, the shutter 26 is closed after a predetermined shutter time, and the stored electrical charge of the CCD 30 is drained to the image capturing signal processor 32. The digital image data generated by the result of the process undertaken by the image capturing signal processor 32 is output to the main bus 82. The generated digital image data is temporarily stored in the main memory 68. Then, the stored digital image data is processed by the YC processor 70 and the compression/extension processor 78. The processed digital image data is recorded in the optional device via the optional device controller 74. The recorded digital image data is displayed on the LCD monitor 102 for a period of time. Therefore, the user can check the photographed image. This process completes the series of photographing operations.

If the digital camera 10 is in the play mode, the main CPU 62 reads image data of the last picture taken from the main memory 68 through the memory controller 64. The main CPU 62 then displays the image on the LCD monitor 102 of the display unit 100.

If the user instructs "next" or "back" at the function setting section 116, a photographed image taken before and after the presently displayed image is displayed on the LCD monitor 102.

The entire structure of the digital camera 10 and the outline of its operations have been described above. The structure characterized by the present embodiment will be described in the following.

Figure 2:
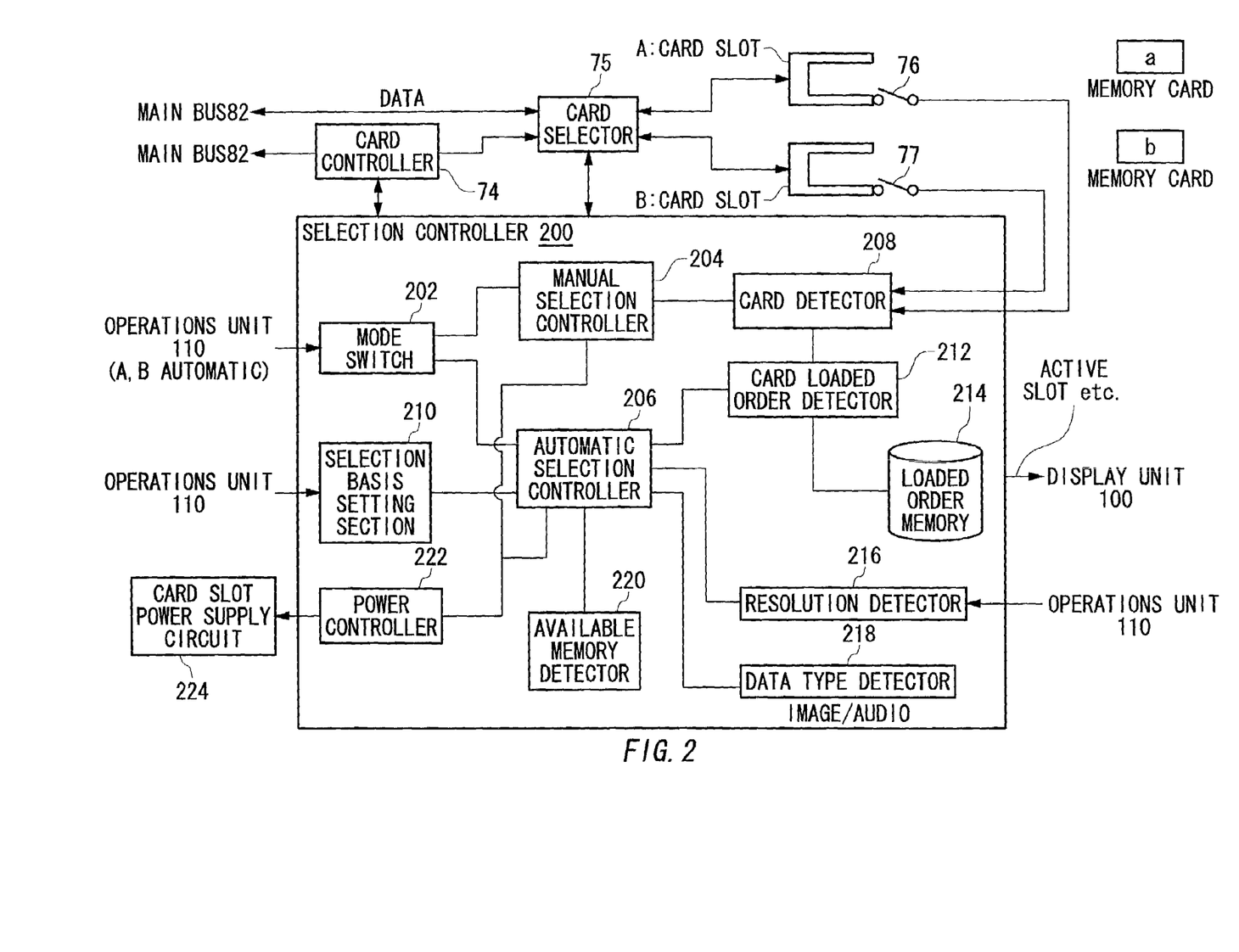
FIG. 2 is a functional block diagram showing the main structure of the parts relating to the two memory card slots of the digital camera in FIG. 1.

FIG. 2 is a block diagram showing the characteristic structure, that is, two card slots and the structure relating to their controls, according to the present embodiment. As shown in FIG. 2, the digital camera 10 according to the present embodiment includes a card slot A, a card slot B, a card selector 75, and a selection controller 200.

A detachable memory card is loaded in the card slot A and the card slot B, respectively. Each card slot A or B writes data in a memory card and reads data from the memory card. Each card slot A or B may be adapted for memory cards with different specs. For example, one memory card may be a SMART MEDIA and the other memory card may be a COMPACT FLASH.

Card detection switches 76 and 77 are attached to the card slots A and B, respectively. Each switch 76 or 77 opens and closes according to the insertion and ejection of a memory card. A switching signal is sent to the selection controller 200.

The card selector 75 is set between both card slots A and B and the main bus 82. The card selector 75 selects either the card slot A or B as a "write-execution slot" according to the instruction of the card controller 74. The "write-execution slot" is the card slot that executes writing of data, and is one of the embodiments of medium wearable units for write-execution of the present invention (it is also the same in the following).

According to the present embodiment, the card selector 75 realizes a selection function by switching the connection. That is, the card selector 75 connects the main bus 82 only to the execution slot. The card controller 74, as described above, undertakes a processing such as a signal conversion necessary between the main bus 82 and the memory card. There is an advantage for this structure in that a plurality of card slots may be used differently by simply adding to the card selector 75 without, for example, changing the card controller 74. General-purpose LSI and the like may be used for the card controller 74.

As a modification, the main bus 82 is directly connected to the card slot A and the card slot B. The main bus 82 provides data to both card slots A and B. The card selector 75 realizes the selection function by providing a selection signal. In other words, the card selector 75 sends a selection signal to either the card slot A or B, or write-execution slot. The card slot, which receives the selection signal, writes data provided from the main bus 82 to the memory card. On the other hand, unless the card slot receives the selection signal, writing of data may be prevented. In this modification, the card selector 75 may be incorporated in the card controller 74, for example. This is advantageous in that the structure and control of the entire apparatus are simple.

The selection controller 200 controls the card selector 75. The selection controller 200 may be realized, for example, by associating a program stored or loaded in the main memory 68 or the non-volatile memory 66 with the main CPU 62 of FIG. 1. Although FIG. 2 is a diagram depicting each function of the selection controller 200 as a unit structure, each of the actual functions is not necessarily a physical unit. For example, a loaded order memory 214 in FIG. 2 may be the non-volatile memory 66. The selection controller 200 and the card selector 75 may be unified in one form or another. After all, the great flexibility of the design to achieve the functions of the selection controller 200 of the digital camera 10 may be understood by persons skilled in the art.

The selection controller 200 includes a mode switch 202, a manual selection controller 204, and an automatic selection controller 206.

The mode switch 202 switches between a manual selection mode and an automatic selection mode according to the user operation signal input from the operations unit 110. The user operates the operations unit 110 and selects either "slot A," "slot B," or the "automatic." If the user selects "slot A" or the "slot B," the manual selection mode is set. If the user selects "automatic," the automatic selection mode is set.

The manual selection controller 204 functions when the manual selection mode is set. In the manual selection mode, the user manually selects the write-execution slot. That is, if the user selects "slot A," the manual selection controller 204 sets the card slot A as the write-execution slot. If the user selects "slot B," the manual selection controller 204 sets the card slot B as the write-execution slot.

The card detector 208 notifies the manual selection controller 204 whether or not a memory card is loaded in each slot A or B. The card detector 208 detects the existence of a card based on the switching signal the card detection switches 76 and 77 of card slots A and B.

The manual selection controller 204 changes the write-execution slot depending on the existence of a card. Thus, the manual selection controller 204 selects the other card slot when the card slot selected by the user does not have a memory card loaded. The user may be notified that the selected card slot is without the memory card and that the user may load the memory card in the selected card slot. When user believes that the intended memory card is loaded in the selected card slot despite that memory card is not actually loaded, an unintended memory card being automatically selected may be prevented. The notice may be by audio, by display using text or image data, or by other notice methods. A plurality of notice methods may be used at the same time.

The selection controller 200 provides the card selector 75 with a signal showing the write-execution slot set by the manual selection controller 204. Data is then written into the selected write-execution slot. On the other hand, the automatic selection controller 206 functions when the automatic selection mode is set. The automatic selection controller 206 automatically selects the write-execution slot based on a predetermined automatic selection basis, which reflects the user's medium selection traits.

The automatic selection basis according to the present embodiment will be described in the following. According to the conventional art as noted previously, the card slot is selected according to the available memory of the memory card. However, if it is supposed that the user selects the card slot by himself or herself, it is mainly when the available memory is low that the user considers the availability of memory space. In general, that is, when the available memory space is enough, the availability of space is typically not considered. If the card slot is selected based simply on the space availability basis, data may be recorded in an unintended memory card. This unintended selection of the memory card may cause that data to be alternately recorded in both memory cards, thereby the user may be confused with which data is recorded in which memory card, for example.

Therefore, the present embodiment focuses on the fact that "what a user typically considers when selecting the card slot generally is that whether or not the data management after recording is simple rather than the availability of a memory space." General users have a trait to select the card slot or the memory card for recording to make the data management simple, or in other words, medium selection traits. According to the present embodiment, the automatic selection basis that reflects the medium selection traits of these general users is set.

Figure 3:
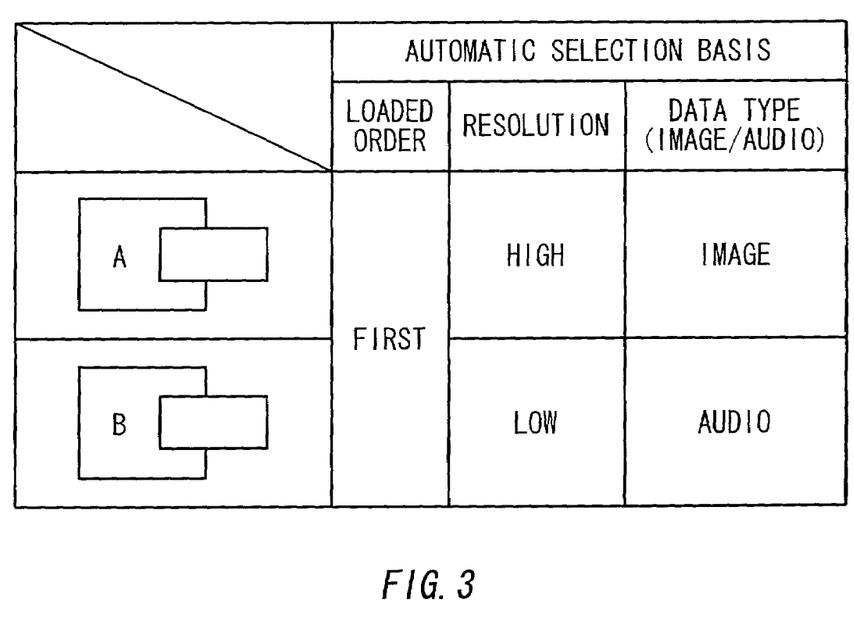
FIG. 3 is a table showing the outline of the automatic selection basis used for the selection controller in FIG. 2.

Referring to FIG. 3, specifically the three automatic selection bases may be selectively set according to the present embodiment.

(1) Loaded order: The card slot in which the memory card is first loaded is selected as the write-execution slot. If this basis is taken, it is when the data recorded in the first-loaded memory card becomes full that data is then written in the next memory card. Thus, the data management is simplified.

When the difference of the loaded time between the two card slots is small, it may be considered that "the loaded time is the same." For example, the time difference of the memory cards loaded is monitored, and if the time difference is below a predetermined threshold value, it is judged that the memory cards are loaded in both card slots simultaneously. One of the slots may be set as a default slot and selected as the write-execution slot. Otherwise, the former write-execution slot is continuously used. By conducting this processing, the appropriate card slot is selected when the user continuously loads two memory cards.

(2) Data resolution: A camera that can change the resolutions with two steps is presumed here. A write-execution slot is changed according to the resolution. The management of high resolution data and low resolution data becomes simple. The resolutions with more than three steps may be set. Those resolutions are divided into two groups. The designation of a group may be automatic or may follow a user's instruction.

(3) Data type: A write-execution slot is set according to the data type. The data types are, for example, image data and non-image data. The non-image data is, for example, audio data. It is proposed that a digital camera record audio, such as music, associated with image data. The audio data may be effectively used to comprehend the photographic environment. The audio data and image data are recorded in different memory cards. Otherwise, image data with audio data and image data without audio data are recorded in different memory cards.

Also as described before, the card slots A and B may be adapted to different types of memory cards. In this case, the selection basis may be set in order to make the data type correspond with the memory card type. The user becomes capable of managing data because the user may learn to associate the type of written data with the type of the memory card.

Deciding which basis among the plurality of bases described above differs depending on users and circumstances. Therefore, the digital camera 10 has a structure where users may select one from the plurality of selection bases.

Referring back to FIG. 2, the user may operate the operations unit 110 and select the automatic selection basis. A selection basis setting section 210 selectively sets a plurality of automatic selection bases according to the user's instruction. Any of "loaded order," "resolution," or "data type" is set. The automatic selection controller 206 refers to the set basis and selects the write-execution slot. A card loaded order detector 212, the loaded order memory 214, a resolution detector 216, and a data type detector 218 are established for this process.

The card loaded order detector 212 detects the order of the loaded memory card by using the detection result of the existence of a card, which is undertaken by the card detector 208. The card loaded order detector 212 may detect the loaded order directly from the detection signal of the card detection switches 76 and 77 or by any other means. The loaded order memory 214 stores the loaded order. Since it is preferable that the loaded order memory 214 be capable of performing backup data even if the power is turned off, the loaded order memory 214 may preferably be set in a non-volatile memory. The information of the loaded order may be sent to the automatic selection controller 206 according to a request.

The resolution detector 216 detects the resolution of recording data. This information may be obtained through the operations unit 110. That is, when the user sets the resolution of photographing by using the operations unit 110, the information is sent to the resolution detector 216. The data type detector 218 detects the data type of recording data. According to the present embodiment, whether the data is image data or audio data is detected.

The automatic selection controller 206 refers to these detection results and selects the write-execution slot based on the automatic selection basis. Necessary detection results are referred to according to the set selection basis. The selection controller 200 provides the card selector 75 with a signal showing the write-execution slot set by the automatic selection controller 206. Thus, data is written in the selected write-execution slot.

Moreover, the selection controller 200 includes an available memory detector 220. This available memory detector 220 effectively functions when the available memory of a card becomes small. The available memory detector 220 detects whether or not the available memory is enough, for example, whether or not the available memory becomes less than a predetermined value, and sends the detection results to the automatic selection controller 206. Also, the available memory detector 220 may, for example, detect whether or not there is enough memory for recording one piece of picture image. The automatic selection controller 206 changes the write-execution slot when there is not enough available memory in the current write-execution slot.

Further, the selection controller 200 includes a power controller 222. The power controller 222 controls a card slot power supply circuit 224 and limits the power supply to the card slot that is not selected as the write-execution slot. Preferably, the power controller 222 shuts down the power supply. Thus, power may be saved.

When a card slot that adapts to a memory card requires a continued power supply, the effect of power saving may be prominently gained by limiting the power supply when not using the card slot (that is, when the card slot is not selected as a write-execution slot).

Furthermore, the selection controller 200 notifies the user with various pieces of information by using the display unit 100. The displaying information includes examples such as a "setting mode" (manual or automatic), or a "slot in use" (the slot selected by the manual selection mode or the write-execution slot selected by the automatic selection mode). In the automatic selection mode, the set automatic selection basis is also displayed. Moreover, it may display which data is recorded in which respective memory card, by using a list or an index image. A Light Emitting Diode, or LED, may also be used for displaying these pieces of information and may be displayed by distinguishing into the following types: when a memory card is loaded; when the memory card is not loaded; and when the card slot loaded with the memory card is selected. For example, the LED is green when the memory card is loaded; no lighting when the memory card is not loaded; and red when the loaded memory card is selected. These pieces of information may be viewed using the finder 34.

According to the present embodiment, two card slots are shown. However, three or more card slots may be included. In the case of three or more card slots, the priority order of slots for the automatic selection mode (for example, A, C, and B) may be displayed.

Figure 4:
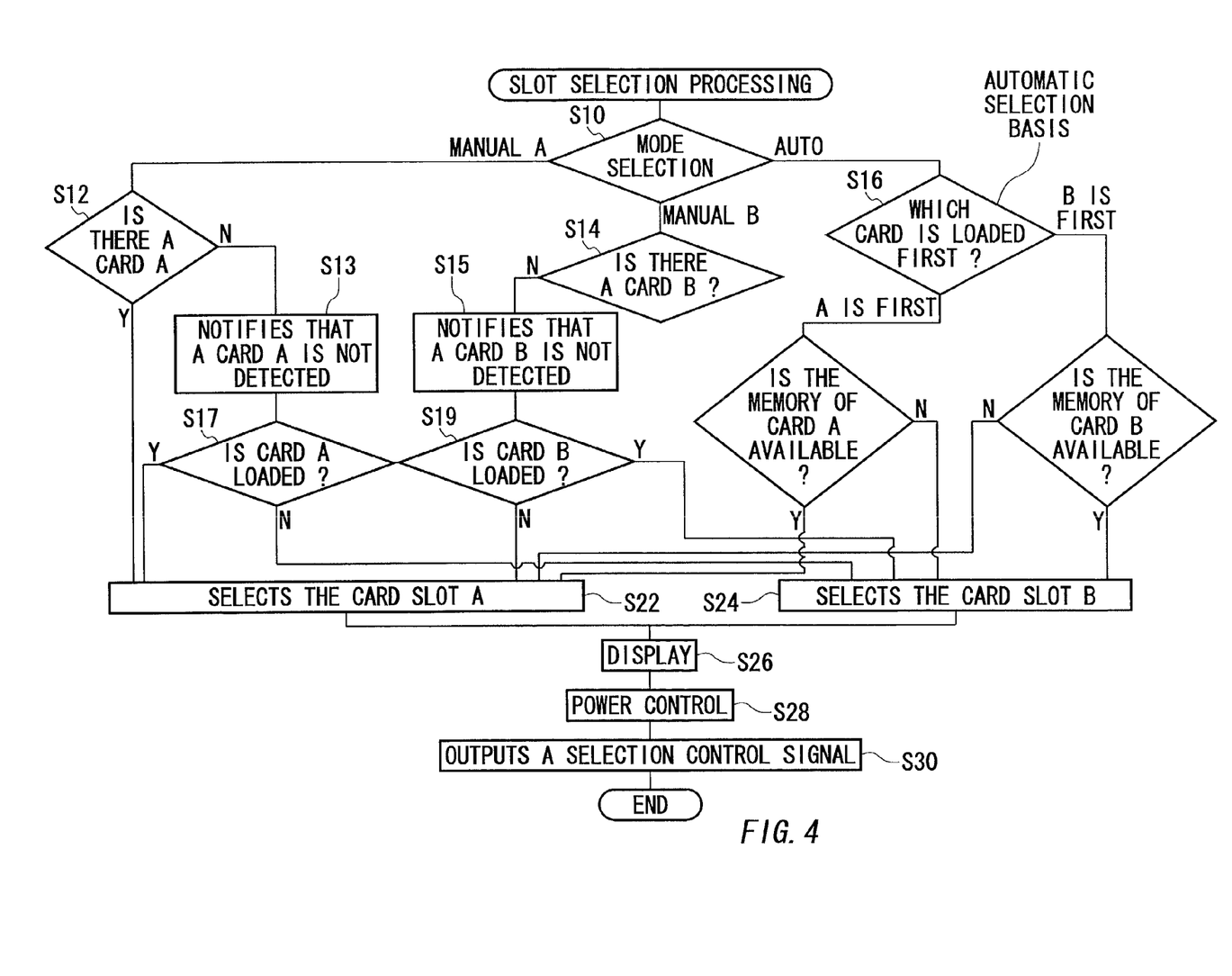
FIG. 4 is a flowchart showing the order of the processing undertaken by the selection controller in FIG. 2.

FIG. 4 is a flowchart showing the process of control undertaken by the above-mentioned selection controller 200. First, the mode selection is conducted based on the user's operation using the operations unit 110, at step S10. When the user designates the "slot A," the manual selection mode is set, and whether a memory card is loaded in the card slot A is detected, at step S12. If the memory card is loaded in the card slot A, the card slot A is selected, at step S22. On the other hand, if the memory card is not loaded in the card slot A, the selection controller 200 notifies the user that the memory card is not loaded, at step S13. If the user inserts the memory card into the card slot A by this notice, at step S17, Y, the card slot A is selected, at step S22. If the user does not insert the memory card into the card slot A, at step S17, N, the card slot B is selected, at step S24.

When the user designates the "slot B," the process continues to step S14 from step S10. The manual selection mode is set, and whether or not a memory card is loaded in the card slot B is detected, at step S14. If the memory card is loaded, the card slot B is selected, at step S24. On the other hand, if the memory card is not loaded, the selection controller 200 notifies the user that the memory card is not loaded, at step S15. If the user inserts the memory card into the card slot B, at step S19, Y, the card slot B is selected, at step S24. If the user does not insert the memory card, at step S19, N, the card slot A is selected at step S22.

When the user designates the "automatic," the process continues to step S16 from step S10. The automatic selection mode is set, and the automatic selection controller 206 selects the card slot based on the automatic selection basis. The automatic selection basis is set by the selection basis setting section 210. It is presumed here that the "card loaded order" is set as the automatic selection basis. At step S16, the detection result of the card loaded order detector 212 is referred to. If the memory card in the card slot A is loaded ahead of the memory card of the card slot B, it is detected whether there is enough available memory of the memory card in the card slot A, at step S18. If the available memory is enough, at step S18, Y, the card slot A is selected, at step S22. If the available memory is not enough, at step S18, N, the card slot B is selected, at step S24.

On the other hand, if it is detected that the memory card in the card slot B is loaded ahead of the memory card in the card slot A, whether the available memory of the memory card in the card slot B is enough is detected, at step S20. If the available memory is enough, at step S20, Y, the card slot B is selected, at step S24. If the available memory is not enough, at step S20, N, the card slot A is selected, at step S22.

The selection controller 200 displays information, such as the selected slot, through the display unit 100 or other display means, at step S26. Moreover, the power controller 222 functions to limit or, preferably, stop the power supply to the slot that is not selected, at step S28.

Further, the selection controller 200 sends the card selector 75 a selection control signal showing the write-execution slot selected at step S22 or S24, at step S30. The card selector 75 operates according to the control signal, and thus, data is written in the memory card of the selected card slot.

In the process shown in FIG. 4, the "loaded order" is set as the automatic selection basis. If another automatic selection basis is set, the process according to that automatic selection basis is undertaken. That is, if the "resolution" is set as the automatic selection basis, the card slot is selected according to the resolution of the recording data. If the "data type (image/audio)" is set as the automatic selection basis, the card slot is selected according to the data type. The detectors 212, 216, and 218 provide detection bases for the selection.

Figure 5:
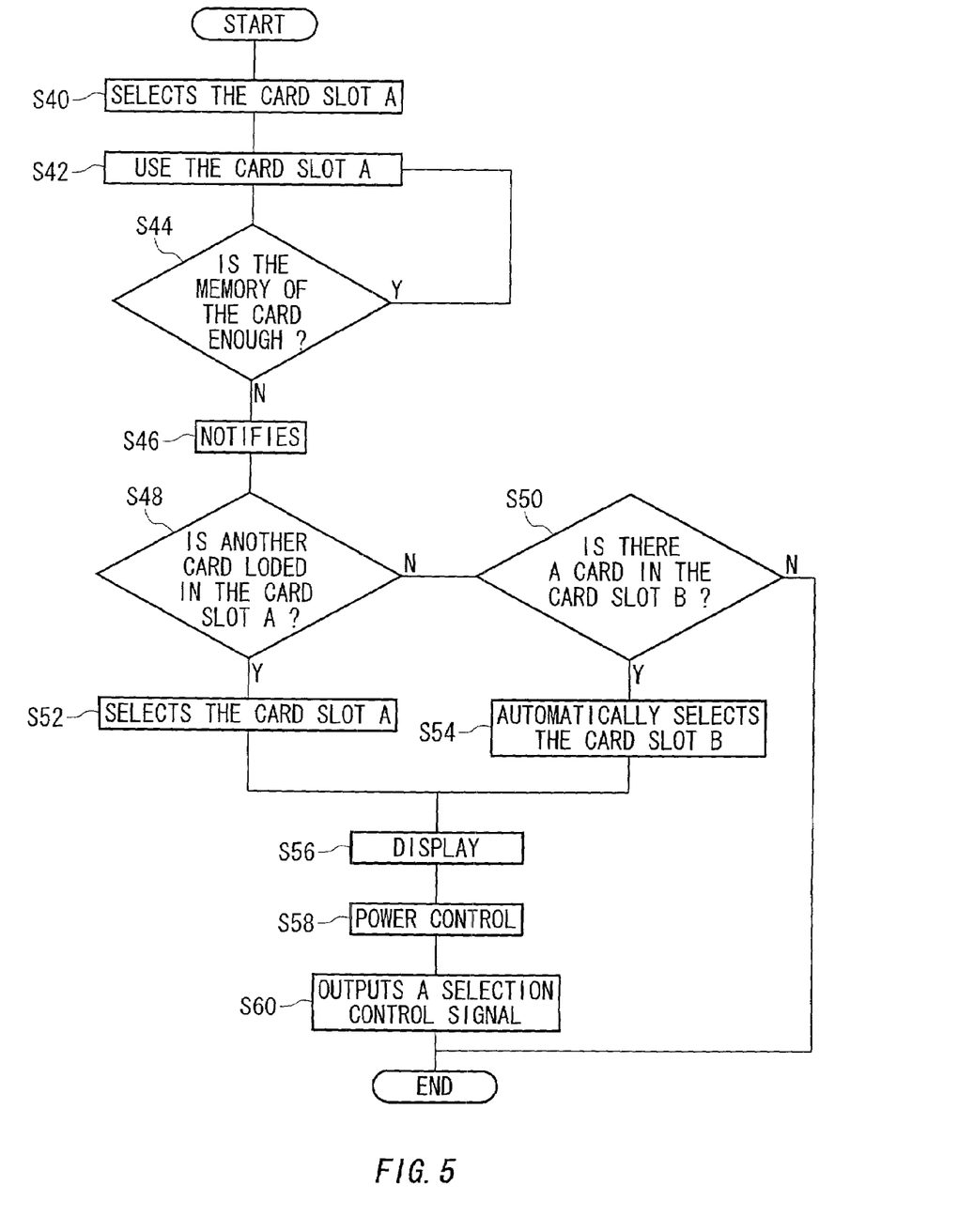
FIG. 5 is a flowchart showing the order of the processing undertaken by the selection controller in FIG. 2.

FIG. 5 is a flowchart showing the control process undertaken by the selection controller 200 in a case where either one of the card slots is selected and is being used but the available memory becomes low. The process when the card slot A is selected first is described here, for example. First, the mode selection is conducted based on the user's operation using the operations unit 110, and the card slot A is assumed to have been selected manually or automatically, at S40.

When it is detected that there is not enough available memory, at step S44, N, while the user is using the card slot A, at step S42, the selection controller 200 notifies the user that there is not enough available memory, at step S46. If there is enough available memory, at step S44, Y, the card slot A is continually used, at step S42. If the selection controller 200 notifies that there is not enough available memory, then whether another memory card is loaded in the card slot A is detected, at step S48.

If another memory card is detected in the card slot A, at step S48, Y, the card slot A is continually selected, at step S52. If another memory card is not detected in the card slot A, at step S48, N, whether a memory card is loaded in the card slot B is detected, at step S50. If the memory card is loaded in the card slot B, at step S50, Y, the card slot B is selected, at step S54. If the memory card is not loaded in the card slot B, at step S50, N, this control process is completed.

The selection controller 200 displays information, such as, the selected slot, through the display unit 100 or other display means, at step S56. Moreover, the power controller 222 functions to limit or, preferably, stop the power supply to the slot that is not selected, at step S58.

Further, the selection controller 200 sends the card selector 75 a selection control signal showing the write-execution slot selected at step S52 or S54, at step S60. The card selector 75 operates according to the control signal, and thus, data is written in the memory card of the selected card slot.

The characteristic structure and the operations of the digital camera according to the present embodiment have been described above. According to the present embodiment, a write-execution slot is selected based on an automatic selection basis. Since the automatic selection basis reflects a user's medium selection traits, data may be written in an appropriate memory card. Also, by switching between the manual selection mode and the automatic selection mode, data may be written in an appropriate memory card that meets the user's requirement. Moreover, by using the detection result of the available memory, in addition to the automatic selection basis, data may be written to the appropriate memory card. Further, by displaying the result of the card slot selection, the user may easily learn in which card slot data is written. Furthermore, by limiting the power supply to the card slot other than the write-execution slot, power may be saved. In other words, the number of applied media may be increased while controlling the increase of the power consumption. Moreover, by using a detection result of the available memory, in addition to the automatic selection basis, data may be written in an appropriate memory card. Further, by displaying the result of the card slot selection, the user may easily learn in which card slot data is written. Furthermore, by limiting the power supply to the card slot other than the write-execution slot, power may be saved. In other words, the number of applied media may be increased while controlling the increase of the power consumption.

Although the present invention has been described by way of exemplary embodiment, it should be understood that those skilled in the art might make many changes and substitutions without departing from the spirit and the scope of the present invention, which is defined only by the appended claims.

As a first modification, types of memory cards are, of course, not limited. A memory medium and a medium wearable unit are also not limited to a particular memory card and a particular card slot. A memory medium may be a given medium so far as record data of a digital camera, which is mainly a picture image, can be recorded. A medium wearable unit has a structure in order to adapt to those given media. The medium wearable unit is, for example, a slot for an I/O card. In this case, the I/O card and a memory device of an electronic appliance connected with the I/O card, such as a personal computer, function as the memory medium.

As a second modification, the medium wearable unit may be more than three parts. Those parts may be adapted to same type of memory card or to different types of memory cards. The automatic selection basis described above may adapt to any types of memory card in the same way.

For example, suppose the medium wearable units are three parts, A, B, and C. In the case that the "loaded order" is used as a basis, the medium wearable unit that the medium is loaded first is selected. In the case that the "data resolution" is used as a basis, three types of resolutions are applied to the medium wearable units A, B, and C, respectively. Otherwise, two types of resolutions are set, and one resolution is applied to one of the medium wearable units and the other resolution is applied to the other two medium wearable units. Deciding which one of the two is to be selected is based on another basis. In the case where the "data type" is used as a basis, a similar process maybe applied. In the case of more than four medium wearable units, a similar modification may be applied.

As a third modification, the automatic selection bases are not limited to the above-mentioned "loaded order," "data resolution," and "data type." As defined above, other bases that reflect user's medium selection traits may be applied.

For example, according to the present embodiment, when the "loaded order" is used as a basis, the medium wearable unit where the medium is loaded first is selected as the write-execution slot. However, on the other hand, the medium wearable unit where the medium is loaded last may be selected as a write-execution slot. Users may select which basis to use.

As a fourth modification, the frequency of selection in the manual selection mode conducted by a user may be preferably used for the automatic selection. The selection controller 200 monitors the selection of the medium wearable unit made by the user with manual selection mode and records the result. When the automatic selection mode is set, a write-execution slot that is used most often while in the manual selection mode may be selected. That is, the automatic selection basis is set based on the frequency of selection made while in the manual selection mode, and the medium wearable unit with the high frequency is selected in advance. This automatic selection basis has an advantage in that medium selection traits of an individual user may be reflected. It may be structured in order for users to be able to freely set their own automatic selection bases.

As a fifth modification, a plurality of automatic selection bases may be applied simultaneously. For example, two of the three automatic selection bases according to the present embodiment described above are applied simultaneously. Specifically, the "loaded order" and the "resolution" are used together. Basically, the write-execution slot is selected based on the loaded order. When two media are loaded almost simultaneously, the write-execution slot is selected based on the resolution. Otherwise, in the case of more than three medium wearable units being set, two medium wearable units are selected based on the "resolution" as the first step, and one medium wearable unit is selected according to the loaded order as the second step.

As a sixth modification, a plurality of automatic selection basis may not be selectively set. That is, the digital camera may have a structure that only one automatic selection basis can be set. The most appropriate automatic selection basis is taken according to the specs of the digital camera.

Further, as a seventh modification, an electronic appliance having the function of a digital camera (for example, a computer having a CCD camera) may have the structure of the present invention. These electronic appliances are included in the scope of the digital camera of the present invention.

What is claimed is:

1. An image capturing apparatus that is capable of loading a plurality of memory media, comprising:
    a plurality of medium wearable units in which a respective memory medium is loaded detachably;
    a medium selector for selecting from said plurality of medium wearable units a write-execution medium wearable unit that executes writing of data;
    a selection controller for controlling said medium selector, said selection controller for automatically selecting said write-execution medium wearable unit according to a preset instruction that reflects a user's medium selection trait; and
    a mode switch for switching between a manual selection mode, which a user manually selects said write-execution medium wearable unit, and an automatic selection mode, which the selection controller selects said write-execution medium wearable unit,
    wherein said preset instruction is set based on an order of media loaded to said plurality of medium wearable units, and
    wherein said selected medium wearable unit writes the data to the respective loaded memory medium.

2. The image capturing apparatus as claimed in claim 1, wherein said selection controller selects another medium wearable unit when the available memory of said write-execution medium wearable unit selected according to said preset instruction is not enough.

3. The image capturing apparatus as claimed in claim 1, wherein said selection controller automatically selects another medium wearable unit when the available memory of said selected write-execution medium wearable unit in use is not enough.

4. The image capturing apparatus as claimed in claim 1, wherein said preset instruction is set based on the resolution of image data to be written.

5. The image capturing apparatus as claimed in claim 1, wherein said preset instruction is set based on the type of data to be written.

6. The image capturing apparatus as claimed in claim 4 or 5, wherein said data to be written is classified into image data and non-image data.

7. The image capturing apparatus as claimed in claim 6, wherein said non-image data is audio data.

8. The image capturing apparatus as claimed in claim 1, wherein said plurality of medium wearable units adapt to different types of memory media, and said types of data to be written correspond to the type of memory media in said preset instruction.

9. The image capturing apparatus as claimed in claim 1, further comprising a selection basis setting section for setting at least one preset instruction selected from a plurality of preset instructions.

10. The image capturing apparatus as claimed in claim 1, wherein said selection controller selects another medium wearable unit when said memory medium is not loaded in said write-execution medium wearable unit selected by the user under said manual selection mode.

11. The image capturing apparatus as claimed in claim 1, wherein said selection controller notifies the user that said memory medium is not loaded when said memory medium is not loaded in said write-execution medium wearable unit selected by the user under said manual selection mode, and notifies the user that said memory medium be loaded in said medium wearable unit where said memory medium is not loaded.

12. The image capturing apparatus as claimed in claim 11, wherein said notice is made by audio.

13. The image capturing apparatus as claimed in claim 1, further comprising at least one notice means providing a notice in different ways according to a status of said medium wearable unit.

14. The image capturing apparatus as claimed in claim 1, further comprising a power controller for controlling the power supply to said medium wearable unit that is not selected as said write-execution medium wearable unit.

15. The image capturing apparatus as claimed in claim 1, wherein the image capturing apparatus is a camera.

16. The image capturing apparatus as claimed in claim 1, wherein said preset instruction is set based on at least one of the order of media loaded to said plurality of medium wearable units, a resolution of the data, and a data type of the data.

17. A method for recording data of an image capturing apparatus, comprising:
    preparing a plurality of medium wearable units;
    selecting from said plurality of medium wearable units a write-execution medium wearable unit that executes writing of data;
    controlling said selecting of said write-execution medium wearable unit according to a preset instruction that reflects a user's medium selection trait;

controlling said selected medium wearable unit to write the data to the respective loaded memory medium; and switching a manual selection mode, which a user manually selects said write-execution medium wearable unit, and an automatic selection mode, which an automatic selection controller selects said write-execution medium wearable unit, wherein said preset instruction is set based on an order of media loaded to said plurality of medium wearable units.

18. The data recording method as claimed in claim 17, wherein said controlling said selecting selects another medium wearable unit when there is not enough available memory in said write-execution medium wearable unit selected according to said preset instruction.

19. The data recording method as claimed in claim 17, wherein said controlling said selecting automatically selects another medium wearable unit when the available memory of said selected write-execution medium wearable unit in use is not enough.

20. The data recording method as claimed in claim 17, wherein said preset instruction is set based on the resolution of image data to be written.

21. The data recording method as claimed in claim 17, wherein said preset instruction is set based on the type of data to be written.

22. The data recording method as claimed in claim 20 or 21, wherein said data to be written is classified into image data and non-image data.

23. The data recording method as claimed in claim 22, wherein said non-image data is audio data.

24. The data recording method as claimed in claim 17, wherein said plurality of medium wearable units adapt to different types of memory media, and said types of data to be written correspond to the type of memory media in said preset instruction.

25. The data recording method as claimed in claim 17, further comprising setting at least one preset instruction selected from a plurality of preset instructions.

26. The method for recording data of an image capturing apparatus as claimed in claim 17, wherein said controlling said selecting selects other medium wearable unit when said memory medium is not loaded in said write-execution medium wearable unit selected by the user using said manual selection mode.

27. The method for recording data of an image capturing apparatus as claimed in claim 17, wherein said controlling said selecting notifies the user that said memory medium is not loaded when said memory medium is not loaded in said write-execution medium wearable unit selected by the user using said manual selection mode, and notifies the user that said memory medium be loaded in said medium wearable unit where said memory medium is not loaded.

28. The method for recording data of an image capturing apparatus as claimed in claim 27, wherein said notice is made by audio.

29. The method for recording data of an image capturing apparatus as claimed in claim 17, further comprising notifying for providing a notice in different ways according to a status of said medium wearable unit.

30. The method for recording data of an image capturing apparatus as claimed in claim 17, further comprising controlling the power supply to said medium wearable unit that is not selected as said write-execution medium wearable unit.

31. The data recording method as claimed in claim 17, wherein the data recording method is performed by a camera.

32. The data recording method as claimed in claim 17, wherein said preset instruction is set based on at least one of the order of media loaded to said plurality of medium wearable units, a resolution of the data, and a data type of the data.

33. An image capturing apparatus capable of loading a plurality of memory media, comprising:

a plurality of medium wearable units in which a respective memory medium is loaded detachably;

a medium selector for selecting from said plurality of medium wearable units a write-execution medium wearable unit that executes writing of data; and a selection controller for automatically selecting said write-execution medium wearable unit according to a preset instruction that reflects a user's medium selection trait, wherein said selected medium wearable unit writes the data to the respective loaded memory medium, wherein said preset instruction is set on an order of media loaded to said plurality of medium wearable units, and wherein said preset instruction is set based on the resolution of image data to be written.

34. The image capturing apparatus as claimed in claim 33, wherein the image capturing apparatus is a camera.

35. The image capturing apparatus as claimed in claim 33, wherein said order of media is resolution of image data and/or type of image data.

36. The image capturing apparatus as claimed in claim 33, wherein said preset instruction is set based on a data type of the data.

37. An image capturing apparatus capable of loading a plurality of memory media, comprising:

a plurality of medium wearable units in which a respective memory medium is loaded detachably;

a medium selector for selecting from said plurality of medium wearable units a write-execution medium wearable unit that executes writing of data; and a selection controller for automatically selecting said write-execution medium wearable unit according to a preset instruction that reflects a user's medium selection trait, wherein said selected medium wearable unit writes the data to the respective loaded memory medium, wherein said preset instruction is set on an order of media loaded to said plurality of medium wearable units, and wherein said preset instruction is set based on the type of data to be written.

38. A method for recording data of an image capturing apparatus, comprising:

preparing a plurality of medium wearable unit;

selecting from said plurality of medium wearable units a write-execution medium wearable unit that executes writing of data according to a preset instruction reflecting a user's medium selection trait; and recording the data to a memory medium loaded in the selected medium wearable unit, wherein said preset instruction is set on an order of media loaded to said plurality of medium wearable units, and wherein said preset instruction is set based on the resolution of image data to be written.

39. The method as claimed in claim 38, wherein the method is performed by a camera.

40. The method as claimed in claim 38, wherein said order of media is resolution of image data and/or type of image data.

41. The method as claimed in claim 38, wherein said preset instruction is set based on a data type of the data.

42. A method as for recording data of an image capturing apparatus, comprising:
   preparing a plurality of medium wearable unit;
   selecting from said plurality of medium wearable units a write-execution medium wearable unit that executes writing of data according to a preset instruction reflecting a user's medium selection trait; and
   recording the data to a memory medium loaded in the selected medium wearable unit,
   wherein said preset instruction is set on an order of media loaded to said plurality of medium wearable units, and
   wherein said preset instruction is set based on the type of data to be written.

43. A computer readable medium stored thereon a computer program comprising a set of instructions, when executed by a computer, the computer program to implement a method of recording data of an image capturing apparatus, the program comprising:
   selecting from a plurality of medium wearable units a medium wearable unit that executes writing of data according to a preset instruction reflecting a user's medium selection trait; and
   recording the data to a memory medium loaded in the selected medium wearable unit,
   wherein said preset instruction is set on an order of media loaded to said plurality of medium wearable units, and
   wherein said preset instruction is set based on the resolution of image data to be written.

44. The computer readable medium as claimed in claim 43, wherein the image capturing apparatus is a camera.

45. The computer readable medium as claimed in claim 43, wherein said order of media is resolution of image data and/or type of image data.

46. The computer readable medium as claimed in claim 43, wherein said preset instruction is set based on a data type of the data.

47. A computer readable medium stored thereon a computer program comprising a set of instructions, when executed by a computer, the computer program to implement a method of recording data of an image capturing apparatus, the program comprising:
   selecting from a plurality of medium wearable units a medium wearable unit that executes writing of data according to a preset instruction reflecting a user's medium selection trait; and
   recording the data to a memory medium loaded in the selected medium wearable unit,
   wherein said preset instruction is set on an order of media loaded to said plurality of medium wearable units, and
   wherein said preset instruction is set based on the type of data to be written.

* * * * *